(12) United States Patent
Komaki et al.

(10) Patent No.: US 6,935,654 B2
(45) Date of Patent: Aug. 30, 2005

(54) AIR BAG ACTIVATION DEVICE

(75) Inventors: Hiroyuki Komaki, Kobe (JP); Yoshihiko Maeno, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 142 days.

(21) Appl. No.: 10/371,044

(22) Filed: Feb. 19, 2003

(65) Prior Publication Data

US 2003/0155754 A1 Aug. 21, 2003

(30) Foreign Application Priority Data

Feb. 21, 2002 (JP) ........................................ 2002-044831

(51) Int. Cl.[7] ............................................. B60R 21/32
(52) U.S. Cl. ....................................................... 280/735
(58) Field of Search ........................................ 280/735

(56) References Cited

FOREIGN PATENT DOCUMENTS

| JP | 05038998 A | 2/1993 |
|---|---|---|
| JP | 11078770 A | 3/1999 |
| JP | 2000326822 A | 11/2000 |
| JP | 2001010441 A | 1/2001 |

Primary Examiner—Eric Culbreth
(74) Attorney, Agent, or Firm—Fogg and Associates, LLC; Laura A. Ryan (57) ABSTRACT

To achieve an air bag activation device that does not require the use of a mechanical safing sensor, the air bag activation device of the invention comprises: a first sensor for electronically detecting acceleration; second and third sensors, mounted at right and left front ends of a vehicle, for electronically detecting acceleration; a squib driver inserted between a power supply and a squib; a microcomputer for generating from outputs of the first, second, and third sensors a driving signal for driving the squib driver; safing signal generating means for generating a safing signal from the outputs of the second and third sensors; and an AND gate for receiving the driving signal and the safing signal as inputs, and for producing an output which is supplied to the squib driver.

12 Claims, 7 Drawing Sheets

AIR BAG ACTIVATION DEVICE

CROSS-REFERENCE TO RELATED APPLICATION

This application claims the priority of Japanese Patent Application No. 2002-044831, filed on Feb. 21, 2002.

BACKGROUND OF THE INVENTION

1. Field of the Invention

The present invention relates to a device for activating an air bag, for occupant protection, in the event of a vehicle collision.

2. Prior Art

Figure 1:
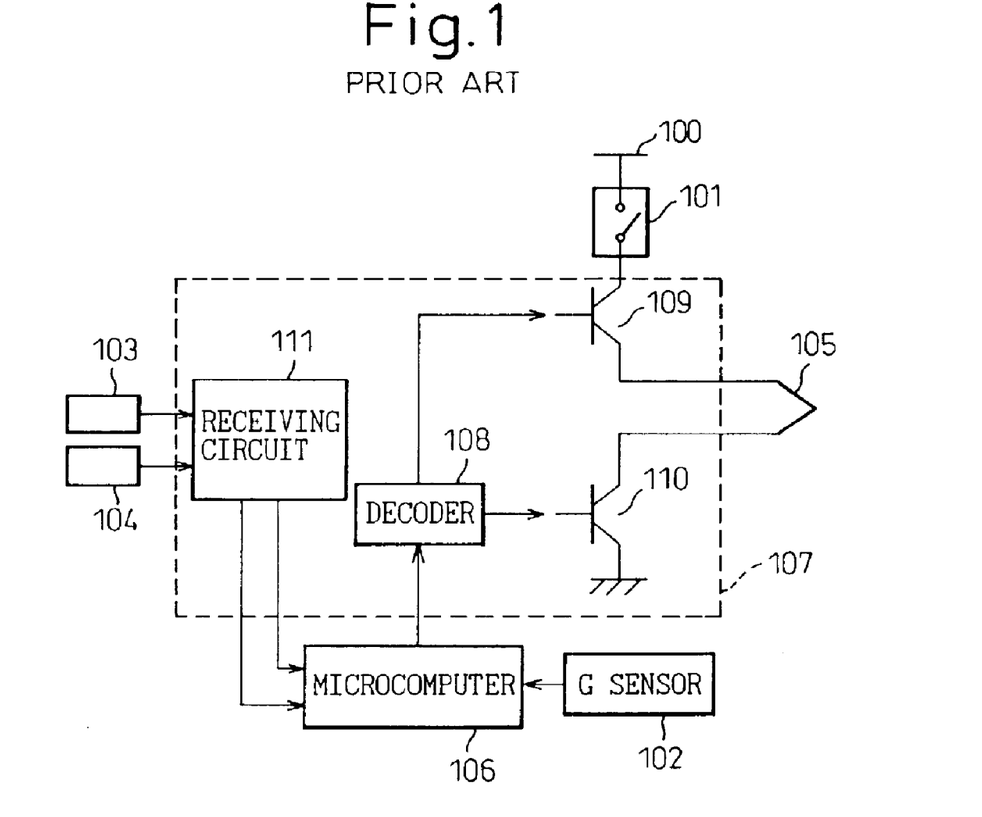
FIG. 1 is a diagram showing the configuration of a prior art air bag activation device.

FIG. 1 shows the configuration of a prior art air bag activation device. In the figure, reference numeral 100 is a power supply for igniting an air bag, which usually comprises a battery and a backup capacitor. Reference numeral 101 is an acceleration sensor, generally known as a mechanical safing sensor, for mechanically detecting impact severity. Reference numeral 102 is an acceleration sensor, generally known as a G sensor, for electronically detecting impact severity. Reference numerals 103 and 104 are acceleration sensors mounted at the right and left front ends of a vehicle and used to electronically detect the severity of the impact applied to the vehicle; this type of sensor is generally known as a front sensor.

Further, reference numeral 105 is an igniter (hereinafter called the squib) which, when energized, ignites and causes a chemical to undergo a chemical reaction to generate gas. The gas is used to inflate the air bag. Reference numeral 106 is a microcomputer which processes the acceleration signals supplied from the G sensor 102 and the right and left front sensors 103 and 104, determines whether the impact applied to the vehicle is of a severity that warrants the activation of the air bag, and if it is warranted, produces a signal for igniting the squib.

The section enclosed by dashed lines in FIG. 1 is a squib ignition circuit which is usually implemented using an integrated ASIC. The ignition circuit 107 contains a decoder 108 for decoding the signal supplied from the microcomputer 106, and for supplying a conduction signal to the bases of transistors 109 and 110 which together constitute a squib driver. The ignition circuit 107 further contains a receiving circuit 111 for receiving signals from the right and left front sensors 103 and 104. Outputs of the receiving circuit 111 are sent to the microcomputer 106 which detects the mode of crash based on such factors as the difference between the impact severities detected by the right and left sensors. The detected information is used to determine the mode of air bag deployment.

In the air bag activation circuit described above, the acceleration (G) signals from the G sensor 102 and the right and left front sensors 103 and 104 are processed by the microcomputer 106 to determine whether the impact is due to a crash and to determine the mode of crash. If it is determined that a crash has occurred, the microcomputer 106 produces a signal to turn on the transistors 109 and 110; this signal is decoded by the decoder 108 and applied to the bases of the transistors 109 and 110. As a result, the transistors 109 and 110 are turned on, and an ignition current is thus supplied to the squib.

On the other hand, the mechanical safing sensor 101 mechanically detects impact severity, independently of the G sensor 102 and the right and left front sensors 103 and 104, and if the impact severity is greater than a predetermined value, the contact is closed to form a state in which a current can be supplied to the transistors 109 and 110. The magnitude of impact severity that causes the mechanical safing sensor 101 to close the contact is chosen to be smaller than the magnitude of impact with which the G sensor 102 determines that a crash has occurred.

The reason is that the mechanical sensor 101 is provided primarily for safing purposes, that is, to prevent an erroneous activation of the air bag due to malfunctioning of the G sensor 102 or the microcomputer 106; more specifically, when an impact is distinctly detected by the mechanical sensor 101 and, on top of that, the G sensor 102 detects the occurrence of a crash, then the current is supplied to the transistors 109 and 110.

Accordingly, in this ignition circuit, if the G sensor 102 or the microcomputer 106 malfunctions due to noise caused by an external electric wave or the like, and outputs a signal indicating the occurrence of a crash when actually a crash has not occurred, since such noise does not cause the mechanical safing sensor 101 to close its contact, an erroneous activation of the air bag is prevented.

As described above, in the prior art air bag activation circuit, a safing system is constructed by providing the mechanical sensor in addition to the electronic sensors in order to prevent an erroneous activation of the air bag due to malfunctioning of the electronic G sensor, the microcomputer, or the like.

SUMMARY OF THE INVENTION

However, such a mechanical safing sensor is large in size and expensive in construction, and thus remains a major barrier to achieving cost and size reductions in the commercial implementation of the activation device. There is therefore a need for an air bag activation device equipped with a safing system that does not use a mechanical sensor.

To solve the above problem, the present invention aims to develop a novel electronic safing system that utilizes the outputs of the right and left front sensors, and thus provide an air bag activation device that does not use a mechanical safing sensor.

To achieve this, a first air bag activation device according to the present invention comprises: a first sensor for electronically detecting acceleration; second and third sensors, mounted at right and left front ends of a vehicle, for electronically detecting acceleration; a squib driver inserted between a power supply and a squib; a microcomputer for generating from outputs of the first, second, and third sensors a driving signal for driving the squib driver; safing signal generating means for generating a safing signal from the outputs of the second and third sensors; and an AND gate for receiving the driving signal and the safing signal as inputs, and for producing an output which is supplied to the squib driver.

As described above, in the present invention, the safing system is constructed by utilizing the outputs of the second and third sensors mounted at positions entirely different from the position of the first sensor which is usually located near the center of the vehicle. Accordingly, even when the first sensor or the microcomputer malfunctions due to noise or other external disturbances, the safing system mounted in an entirely different position is unaffected by the noise and thus prevented from malfunctioning. Conversely, if the safing system malfunctions due to some kind of noise, the G sensor and the microcomputer are unaffected by the noise and are thus prevented from malfunctioning.

In this way, according to the present invention, the safing system and the G sensor/the microcomputer do not malfunction simultaneously; therefore, by making provisions to drive the squib driver by the AND of the two inputs, a device that can reliably activate the air bag by reliably detecting the occurrence of a crash can be constructed.

In the above-described device, the safing signal generating means, the squib driver, etc. are integrated into a single IC, and the microcomputer is provided separately from the IC. This serves to protect the safing signal generating means from a runaway of the microcomputer.

Further, in the device of the present invention, the microcomputer has a function to produce a safing signal from the outputs of the second and third sensors, and the fail-safe mechanism is improved by making provisions to generate the safing output only when the safing signal produced by the microcomputer matches the safing signal produced by the safing signal generating means.

A second air bag activation device according to the present invention comprises: first acceleration detecting means (5) for electronically detecting acceleration to determine if a crash has occurred; second acceleration detecting means (2, 3) mounted at a different position from the first acceleration detecting means (5) in order to identify a crash mode; and control means (12) for performing air bag ignition control based on signals supplied from the first (5) and second acceleration detecting means (2, 3) wherein first switching means (9) whose switching operation is controlled by the control means (12) based on the signal output from the first acceleration detecting means (5) and on the crash mode identified from the signal output from the second acceleration detecting means (2, 3), and second switching means (10), whose switching operation is controlled based on the signal output from the first acceleration detecting means (5), are connected in series in an air bag ignition current path.

According to the above device, the second switching means, whose switching operation is controlled based on the output of the second acceleration detecting means, for example, the left and right front sensors, is connected in series with the first switching means; therefore, as long as the second switching means is not turned on, based on the output of the second acceleration detecting means, a current does not flow in the series circuit consisting of the first and second switching means and the air bag is not activated. As a result, even when the control means or the first acceleration detecting means and the control means malfunction due to noise or the like, causing the first switching means to turn on, as the second switching means is not turned on, the current for activating the air bag does not flow and an erroneous activation of the air bag is thus prevented.

DESCRIPTION OF THE PREFERRED EMBODIMENTS

The preferred embodiments of the present invention will be described below with reference to drawings.

Figure 2:
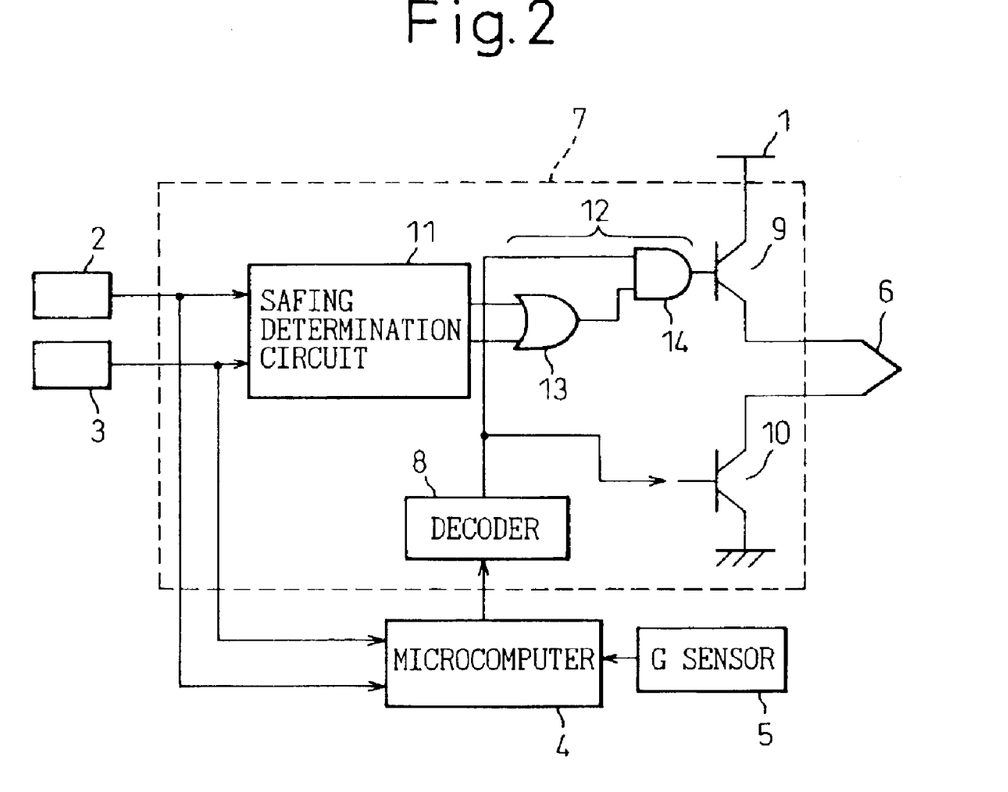
FIG. 2 is a diagram showing the configuration of a device according to one embodiment of the present invention.

FIG. 2 is a block diagram showing the configuration of an air bag activation circuit according to a first embodiment of the present invention. In the figure, reference numeral 1 is a power supply, and 2 and 3 are right and left front sensors mounted at the front ends of a vehicle and used primarily to detect the mode of crash. Further, reference numeral 4 is a microcomputer, 5 is a G sensor, and 6 is a squib. These component elements are the same or similar in configuration to the corresponding elements in the prior art circuit, and will not be described in detail here.

Reference numeral 7 is an ignition circuit which constitutes a unique feature of the present embodiment, and comprises: a decoder 8 for decoding the signal supplied from the microcomputer 4, and for supplying a signal for igniting the squib 6 to the transistors 9 and 10 which together constitute a squib driver, a safing determination circuit 11 for performing a safing determination by detecting signals from the right and left front sensors 2 and 3; and a logic circuit 12 for signal processing. The logic circuit 12 comprises an OR circuit 13 for ORing the determination outputs corresponding to the right and left front sensors 2 and 3, and an AND circuit 14 for ANDing the output of the OR circuit 13 with the output of the decoder 8.

Figure 3:
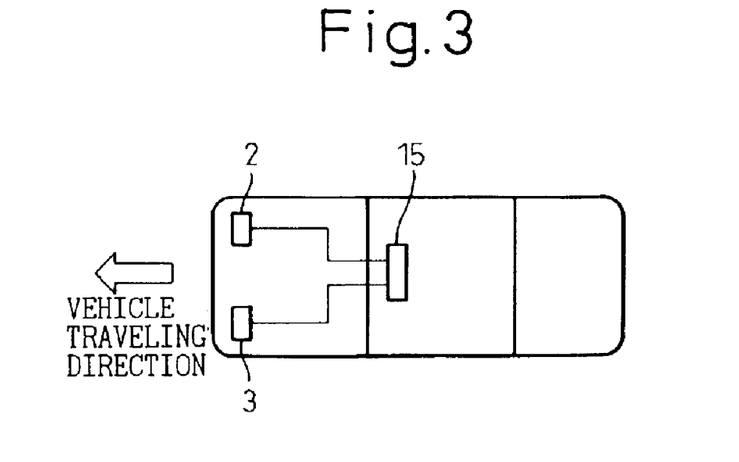
FIG. 3 is a diagram showing the arrangement of various kinds of acceleration sensors on a vehicle.

FIG. 3 shows the positions of the right and left front sensors 2 and 3 relative to the position of the air bag activation circuit 15 on the vehicle. The air bag activation circuit 15 includes the microcomputer 4, the G sensor 5, the squib 6, and the ignition circuit 7.

In the present embodiment, the safing determination circuit 11 is provided within the ignition circuit 7 which is implemented as an integrated ASIC separately from the microcomputer 4. Generally, the microcomputer has the risk of runaway; in that case, if the safing determination circuit 11 were integrated into the microcomputer, the safing determination circuit 11 might erroneously recognize a non-crash event as being a crash and activate the air bag when actually a crash has not occurred. To prevent such a situation, in the present embodiment, the microcomputer 4 is provided outside the IC so that the safing determination circuit 11 will not be affected in the event of runaway of the microcomputer.

As shown in FIG. 3, the G sensor 5 and the right and left front sensors 2 and 3 are located at different positions on the vehicle so as to prevent the two types of sensors from malfunctioning simultaneously. Taking advantage of this, the safing system in the present embodiment is constructed using the front sensors and does not use the traditional mechanical safing sensor.

Accordingly, when the safing determination circuit 11 determines from the outputs of the right and left front sensors 2 and 3 that at least one of the sensors has detected a crash, the resulting signal is input to the AND circuit 14 via the OR circuit 13. In this case, if a crash detection signal from the G sensor 5 is also input to the AND circuit 14 via the microcomputer 4 and the decoder 8, the AND circuit 14 opens its gate and supplies its output signal to the base of the transistor 9 which is thus turned on. As the transistor 10 is already turned on by the output of the decoder 8, a current flows from the power supply 1 to the squib 6 and the air bag is thus activated.

On the other hand, when neither of the front sensors 2 and 3 detects a crash and the gate of the OR circuit 13 is not opened, if the G sensor 5 detects a crash and the microcomputer 4 outputs a crash detection signal to turn on the transistor 7, the transistor 9 remains off because the gate of the AND circuit 14 is closed. As a result, no current flows to the squib 6, so that the air bag will not be activated. That is, in this case, the crash detection by the G sensor 5 is judged to be an erroneous detection due to noise.

The safing determination circuit 11 performs a safing determination using a crash determining threshold which is set lower than that of the determination that the microcomputer 4 makes based on the output of the G sensor 5. As a result, in the air bag activation circuit of the present embodiment, a current flows to the squib and the air bag is activated, only when at least either one of the right and left front sensors has detected a severe impact and, at the same time, the G sensor 5 has detected the occurrence of a crash. Accordingly, if the G sensor malfunctions due to some kind of noise, as neither front sensor detects a severe impact, the safing system does not operate and an erroneous activation of the air bag is thus prevented.

Figure 4:
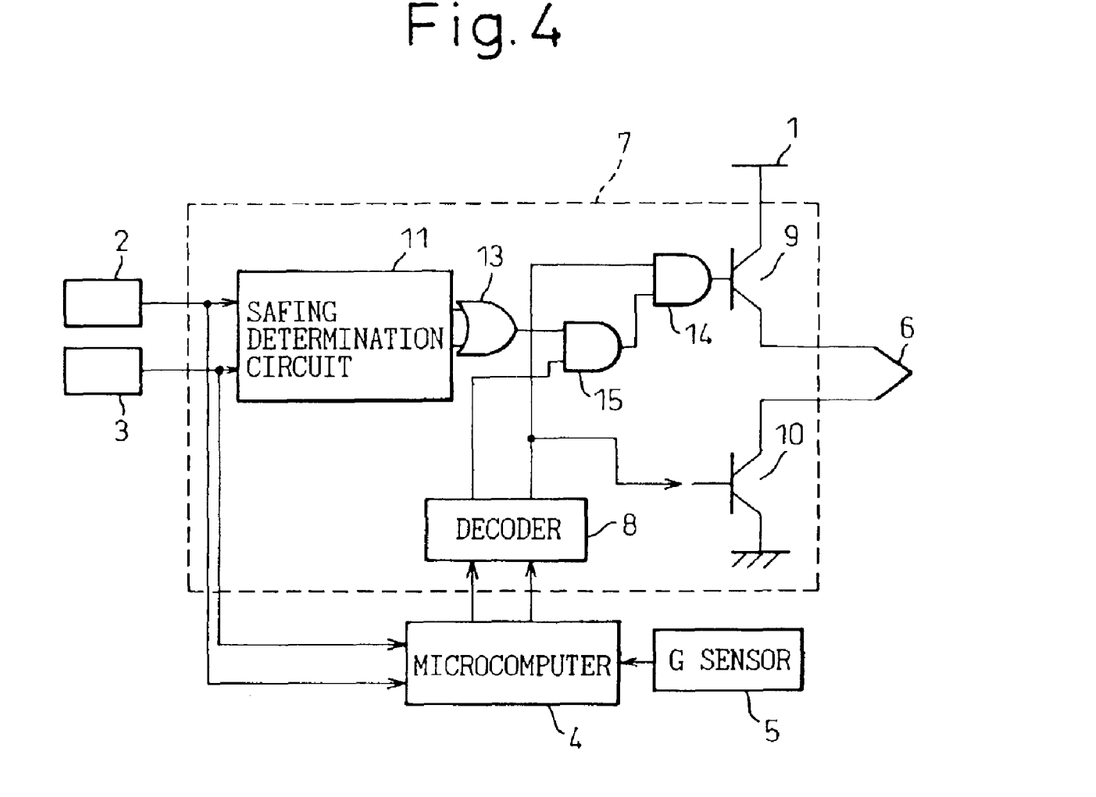
FIG. 4 is a diagram showing the configuration of a device according to a second embodiment of the present invention.

FIG. 4 is a diagram showing the configuration of an air bag activation circuit according to a second embodiment of the present invention. In this embodiment, the outputs of the right and left front sensors 2 and 3 in the activation circuit shown in FIG. 2 are introduced into the microcomputer 4 where a safing determination is performed, and the output of the determination is fed to a second AND circuit 15 via the decoder 8. The other input of the AND circuit 15 is supplied with the safing signal output from the OR circuit 13. Accordingly, the AND circuit 15 produces an output only when the safing determination made in the microcomputer 4 matches the safing determination made in the integrated ASIC.

In this way, the embodiment of FIG. 4 achieves further stabilization of the safing system by employing a kind of fail-safe mechanism which requires that the safing determination made in the microcomputer match the safing determination made in the integrated ASIC.

Figure 5:
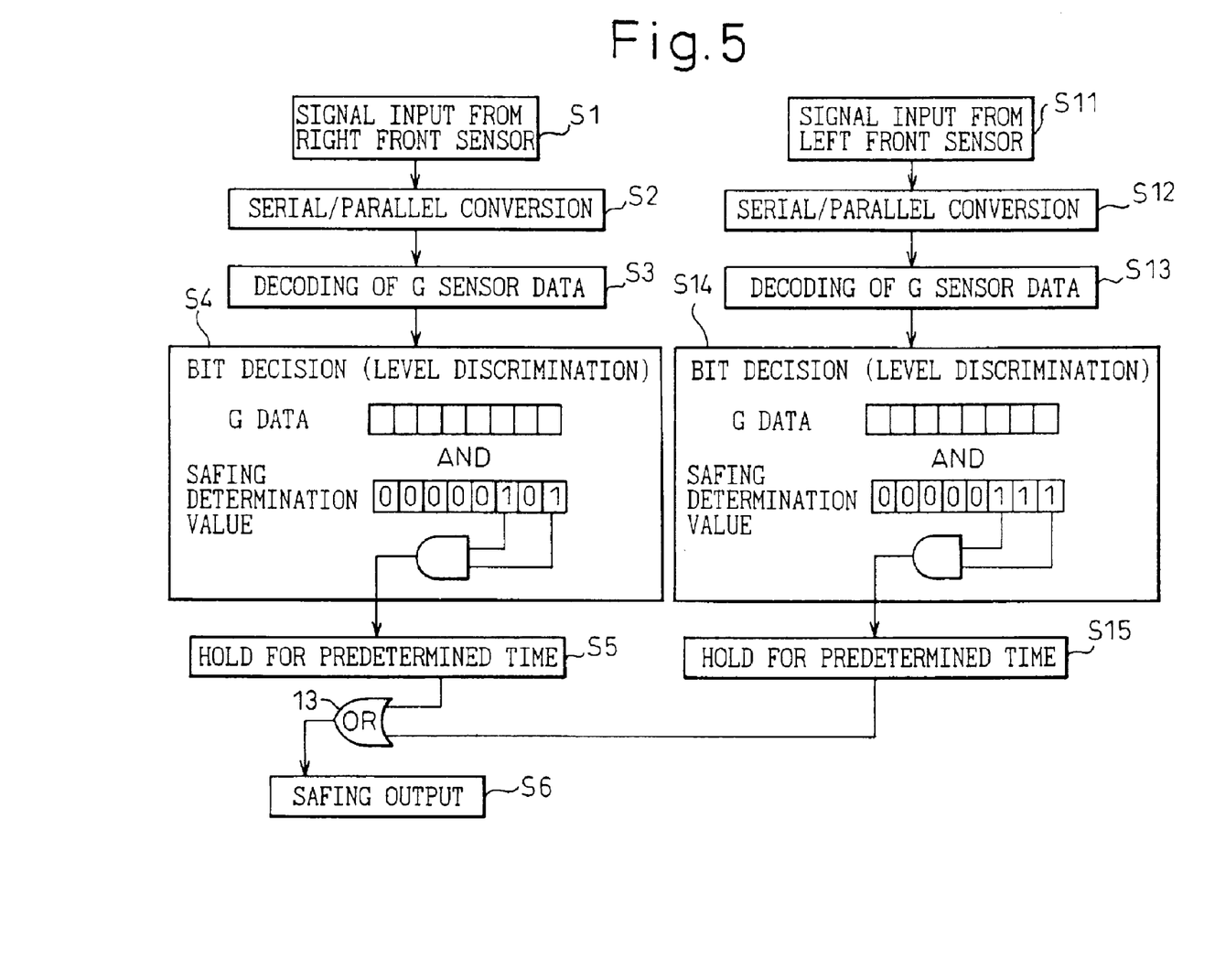
FIG. 5 is a diagram showing one embodiment for a safing determination according to the present invention.

FIG. 5 shows one embodiment for the safing determination performed in FIGS. 2 and 4. First, when the signal from the right front sensor 2 is input in step S1 in serial form to the safing determination circuit 11, the serial signal is converted to parallel form (step S2), after which the signal is decoded into G data (step S3) and stored in a G data register. The thus stored G data is compared bit by bit with the contents of the register in which a predetermined safing determination value is prestored, and if it is determined that the G data exceeds the level of the determination value, a safing signal is output (step S4).

After being held for a predetermined time (step S5), the signal is input to the OR circuit together with the safing signal from the left front sensor obtained through similar steps (steps S11 to S15) performed in parallel with the above steps, and a final safing output is thus obtained (S6). In steps S5 and S15, the output after the safing determination is held for a predetermined time in order to adjust the time difference relative to the crash detection performed in the G sensor.

Figure 6:
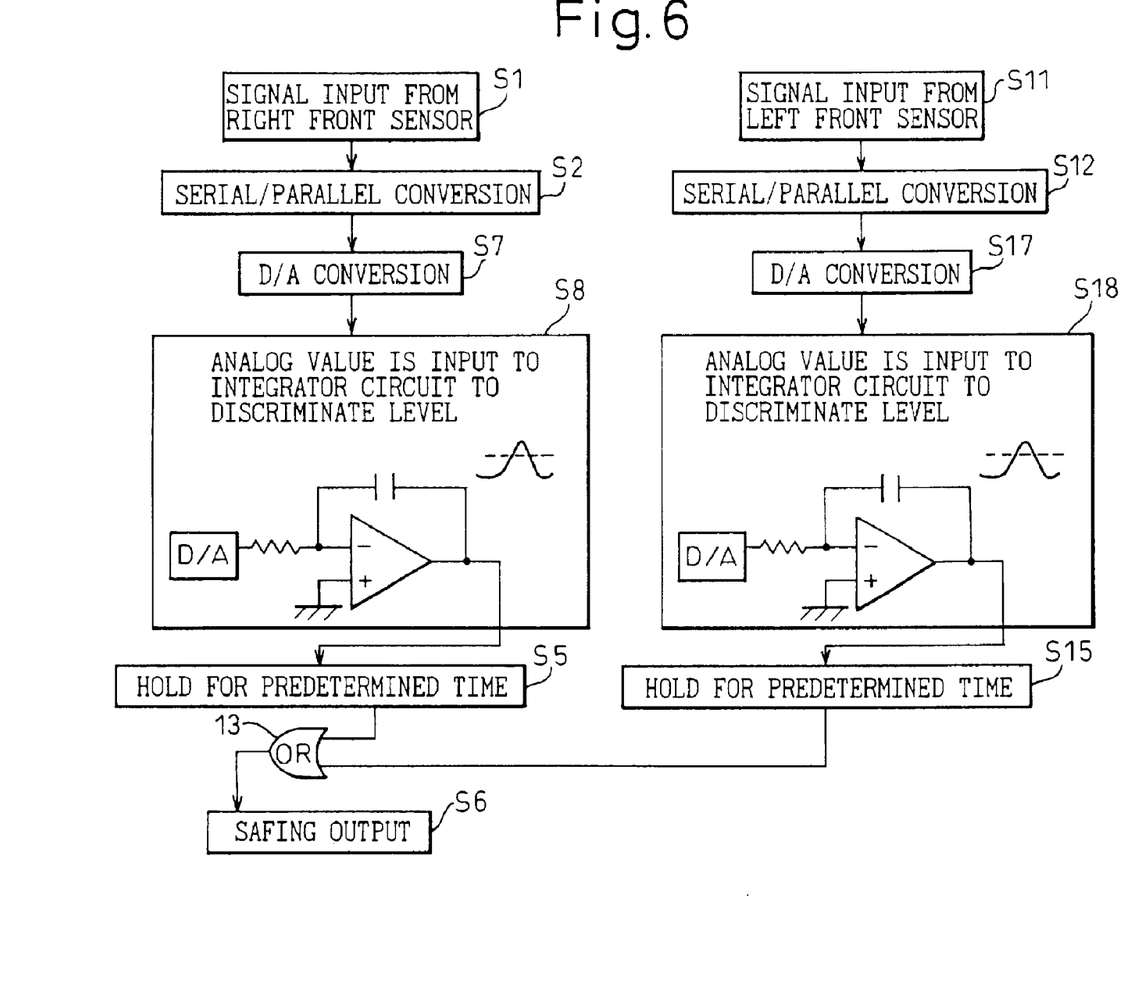
FIG. 6 is a diagram showing another embodiment for a safing determination according to the present invention.

FIG. 6 is a diagram showing another embodiment for the safing determination. In this embodiment, after the serial/parallel conversion in step S2, S12, the signal is converted from digital to analog (step S7, S17), and the level of the resulting analog value is discriminated using an integrator circuit (low-pass filter) (step S8, S18). The feature of this integrator circuit is that the discrimination reference voltage level is predetermined and the safing determination is performed using this voltage level as the threshold value.

Figure 7:
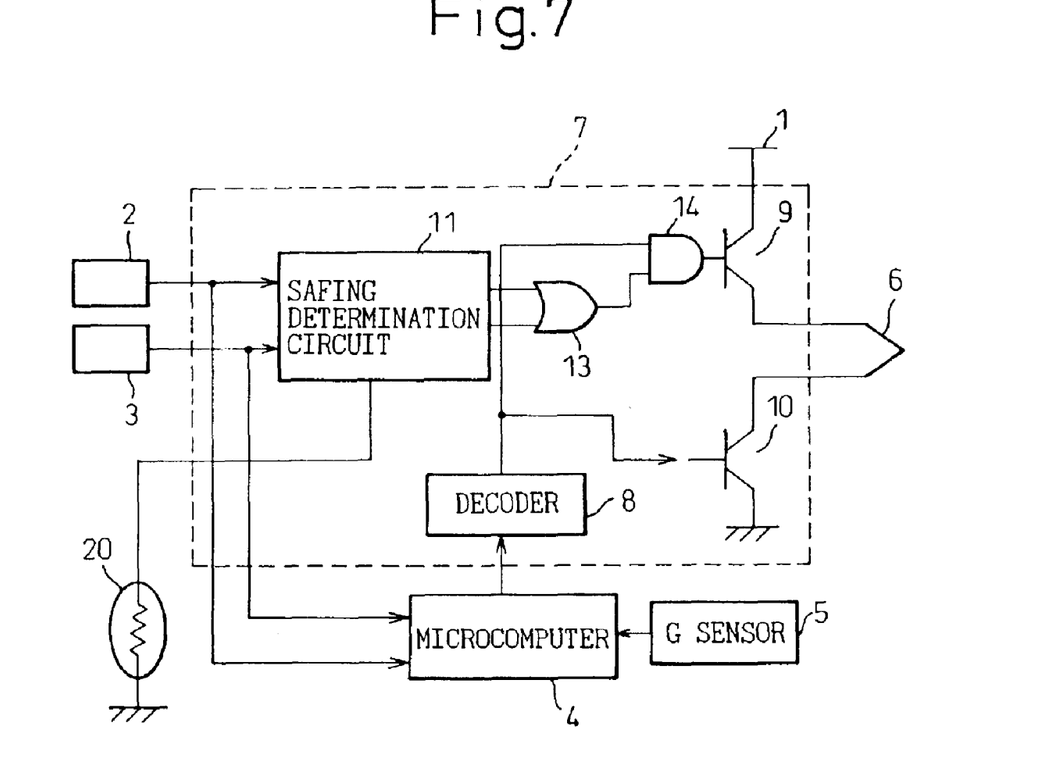
FIG. 7 is a diagram showing the configuration of a device according to a third embodiment of the present invention.

In this embodiment, the threshold value in the integrator circuit can be easily changed, for example, by changing the value of an external resistor 20 shown in FIG. 7. Thus, the circuit is easily adaptable for a change in the crash G characteristic resulting from a change of the vehicle.

Figure 8:
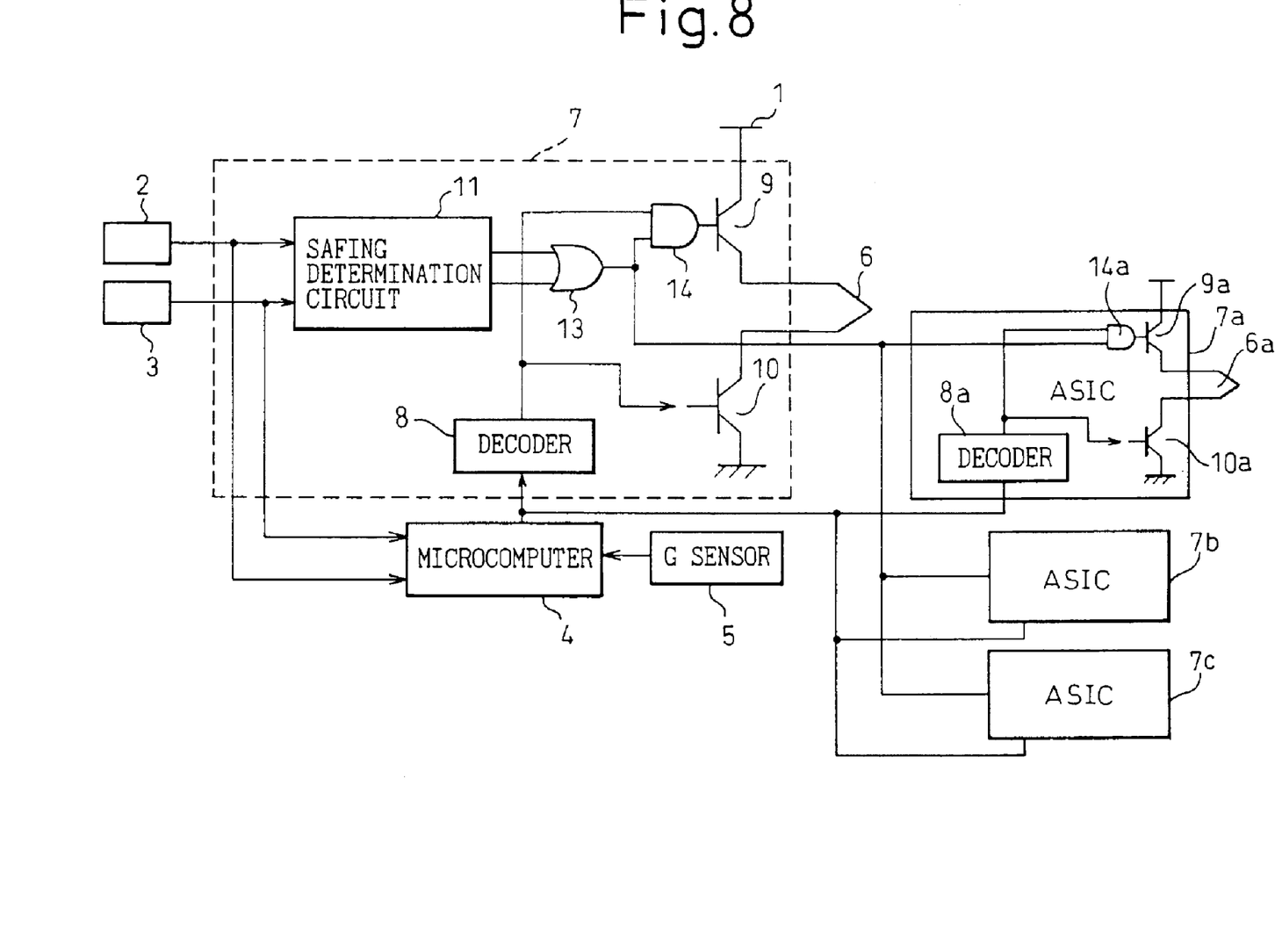
FIG. 8 is a diagram showing the configuration of a device according to a fourth embodiment of the present invention.

FIG. 8 is a diagram showing a further embodiment of the present invention. In this embodiment, the ignition circuit 7 shown in FIG. 2 is provided, for example, in the driver-side air bag, and the safing output (the output of the OR gate 13) produced by the ignition circuit 7 is also supplied to ignition circuits 7a, 7b, and 7c for other air bags such as the passenger-side air bag, rear seat air bag, etc.

Since the air bag ignition circuits 7a, 7b, and 7c are identical in configuration, the configuration will be described by taking the air bag ignition circuit 7a as an example. Reference numeral 8a is a decoder to which the output of the microcomputer 4 is input, 14a is an AND circuit to which the output of the decoder 8a and the safing output of the ignition circuit 7 are input, and 9a and 10a are transistors constituting a driver circuit for activating a squib 6a.

As shown, the air bag ignition circuit 7a is configured to utilize the safing output produced by the air bag ignition circuit 7, which means that the air bag ignition circuits for seats other than the driver's seat need not be equipped with a safing determination circuit or an OR circuit. This simplifies the configuration of the ASIC for each of these circuits, and contributes to reducing the cost of the device.

The above embodiments have each been described by taking the electronic G sensors mounted at the left and right front ends of the vehicle as examples of the sensors used in the safing system, but it will be appreciated that other types of sensors can also be used to detect the mode of a crash by mounting the sensors at positions different from the position of the electronic G sensor located in the center of the vehicle. Furthermore, other than the electronic G sensors, various types of sensors such as strain sensors can also be used.

Further, in each of the above embodiments, the transistor 9 is turned on based on the ANDing between the signal from the safing determination circuit 11 and the signal from the microcomputer 4 but, alternatively, the transistor 9 may be turned on based only on the signal from the safing circuit 11.

As described with reference to the various embodiments above, as the air bag activation device of the present invention does not require the use of a mechanical safing sensor as used in the prior art device, the invention offers a significant effect in reducing the size and cost of the device.

What is claimed is:

1. An air bag activation device comprising:
    a first sensor for electronically detecting acceleration;
    second and third sensors, mounted at right and left front ends of a vehicle, for electronically detecting acceleration;
    a squib driver inserted between a power supply and a squib;
    a microcomputer for generating, from outputs of said first, second, and third sensors, a driving signal for driving said squib driver;
    safing signal generating means for generating a safing signal from the outputs of said second and third sensors; and an AND gate for receiving said driving signal and said safing signal as inputs, and for producing an output which is supplied to said squib driver.

2. An air bag activation device as claimed in claim 1, wherein said squib driver, said safing signal generating means, and said AND gate are lubricated in integrated form on a single IC, and said microcomputer is provided outside said IC.

3. An air bag activation device as claimed in claim 2, wherein said safing signal generating means performs a safing determination by comparing bit-by-bit the output of each of said second and third sensors, obtained in the form of a digital signal, with a digital signal representing a predetermined safing determination value.

4. An air bag activation device as claimed in claim 2, wherein said safing signal generating means performs a safing determination by inputting an analog signal, obtained by D/A converting the output of each of said second and third sensors, into an integrator circuit that uses a predetermined safing determination value as a threshold level.

5. An air bag activation device as claimed in claim 4, wherein said squib driver, said safing signal generating means containing therein said integrator circuit, and said AND gate are fabricated in integrated form on a single IC, said microcomputer is provided outside said IC, and an external resistor is connected to said safing signal generating means so as to be able to adjust said determination threshold level.

6. An air bag activation device as claimed in claim 2, wherein said
microcomputer performs a safing determination based on the outputs of said second and third sensors, and said air bag activation device further includes means for detecting whether said safing determination performed by said microcomputer matches the output of said safing signal generating means, and for passing said safing signal to said AND gate only when a match is detected between said safing determination and the output of said safing signal generating means.

7. An air bag activation device as claimed in claim 1, wherein said safing signal generating means performs a safing determination by comparing bit-by-bit the output of each of said second and third sensors, obtained in the form of a digital signal, with a digital signal representing a predetermined safing determination value.

8. An air bag activation device as claimed in claim 1, wherein said safing signal generating means performs a safing determination by inputting an analog signal, obtained by D/A converting the output of each of said second and third sensors, into an integrator circuit that uses a predetermined safing determination value as a threshold level.

9. An air bag activation device as claimed in claim 8, wherein said squib driver, said safing signal generating means containing therein said integrator circuit, and said AND gate are fabricated in integrated form on a single IC, said microcomputer is provided outside said IC, and an external resistor is connected to said safing signal generating means so as to be able to adjust said determination threshold level.

10. An air bag activation device as claimed in claim 1, wherein said microcomputer performs a safing determination based on the outputs of said second and third sensors, and said air bag activation device further includes means for detecting whether said safing determination performed by said microcomputer matches the output of said safing signal generating means, and for passing said safing signal to said AND gate only when a match is detected between said safing determination and the output of said satin signal generating means.

11. An air bag activation system comprising first and second air bag activation devices, wherein said first air bag activation device comprises:

a first sensor for electronically detecting acceleration;

second and third sensors, mounted at right and left front ends of a vehicle, for electronically detecting acceleration;

a squib driver inserted between a power supply and a squib;

a microcomputer for generating from outputs of said first, second, and third sensors a driving signal for driving said squib driver;

safing signal generating means for generating a safing signal from the outputs of said second and third sensors; and an AND gate for receiving said driving signal and said safing signal as inputs, and for producing an output which is supplied to said squib driver, and said second air bag activation device comprises:

a second AND gate for receiving as inputs said safing signal and the output of said microcomputer supplied from said first air bag activation device and a second squib driver which is driven by an output of said second AND gate.

12. An air bag activation device comprising:

first acceleration detecting means for electronically detecting acceleration to determine if a crash has occurred;

second acceleration detecting means mounted at a different position from said first acceleration detecting means in order to identify crash mode;

a squib for activating an air bag;

control means for performing control to ignite said squib based on outputs of said first and second acceleration detecting means;

first switching means which is connected in series with an ignition current path to said squib, and whose switching operation is controlled by said control means based on the output of said first acceleration detecting means and on the crash mode identified from the output of said second acceleration detecting means; and second switching means which is connected in series with said ignition current path to said squib and with said first switching means, and whose switching operation is controlled based on a signal output from said first acceleration detecting means.

* * * * *

UNITED STATES PATENT AND TRADEMARK OFFICE
CERTIFICATE OF CORRECTION

PATENT NO. : 6,935,654 B2  Page 1 of 1
APPLICATION NO. : 10/371044
DATED : August 30, 2005
INVENTOR(S) : Komaki et al.

It is certified that error appears in the above-identified patent and that said Letters Patent is hereby corrected as shown below:

In Claim 2, Column 7, Line 6, please replace "lubricated" to --fabricated--

In Claim 11, Column 8, Line 33, please insert a --;-- after the word "device"

Signed and Sealed this

Twenty-fifth Day of December, 2007

JON W. DUDAS
*Director of the United States Patent and Trademark Office*